(12) United States Patent
Brand (10) Patent No.: US 8,048,557 B2
(45) Date of Patent: Nov. 1, 2011

(54) ELECTROCHEMICAL DEVICE

(75) Inventor: Christo Brand, Langley (CA)

(73) Assignee: EaglePicher Energy Products Corporation, Surry (CA)

( * ) Notice: Subject to any disclaimer, the term of this patent is extended or adjusted under 35 U.S.C. 154(b) by 943 days.

(21) Appl. No.: 12/023,573

(22) Filed: Jan. 31, 2008

(65) Prior Publication Data

US 2008/0187829 A1 Aug. 7, 2008

Related U.S. Application Data

(60) Provisional application No. 60/887,795, filed on Feb. 1, 2007.

(51) Int. Cl.
 *H01M 2/02* (2006.01)
 *H01M 6/02* (2006.01)
 *H01M 10/38* (2006.01)
 *B23K 26/22* (2006.01)
 *H01G 9/155* (2006.01)

(52) U.S. Cl. ........ 429/163; 429/185; 429/168; 429/169; 429/178; 219/121.64; 29/623.1; 361/502

(58) Field of Classification Search .................. None
See application file for complete search history.

(56) References Cited

U.S. PATENT DOCUMENTS

| | | | | |
|---|---|---|---|---|
| 3,664,878 | A | * | 5/1972 | Amthor ........................... 429/54 |
| 5,595,839 | A | | 1/1997 | Hossain |
| 5,849,431 | A | * | 12/1998 | Kita et al. ..................... 429/164 |
| 6,174,338 | B1 | | 1/2001 | Heller, Jr. |
| 6,399,237 | B1 | * | 6/2002 | Souliac et al. .................. 429/56 |
| 6,586,131 | B2 | | 7/2003 | Hallifax et al. |
| 6,623,884 | B1 | | 9/2003 | Spillman et al. |
| 6,635,381 | B2 | | 10/2003 | Spillman et al. |
| 6,689,506 | B2 | | 2/2004 | Inoue et al. |
| 6,744,238 | B2 | | 6/2004 | Davis et al. |
| 6,801,016 | B2 | | 10/2004 | Davis et al. |
| 6,929,881 | B2 | | 8/2005 | Wutz et al. |
| 7,629,076 | B2 | * | 12/2009 | Miyahisa et al. ............. 429/122 |
| 2003/0211388 | A1 | | 11/2003 | Ruth et al. |
| 2004/0023109 | A1 | | 2/2004 | Rusin et al. |
| 2004/0193227 | A1 | | 9/2004 | Schmidt |
| 2005/0074674 | A1 | * | 4/2005 | Boone et al. ................... 429/247 |
| 2006/0093916 | A1 | | 5/2006 | Howard et al. |
| 2008/0233446 | A1 | * | 9/2008 | Zimmermann et al. ........ 429/25 |

FOREIGN PATENT DOCUMENTS

| | | |
|---|---|---|
| JP | A-8-309568 | 11/1996 |
| JP | A-8-332582 | 12/1996 |
| JP | A-2000-48804 | 2/2000 |
| JP | A-2001-135299 | 5/2001 |
| JP | A-2001-325935 | 11/2001 |
| JP | A-2002-239762 | 8/2002 |

* cited by examiner

*Primary Examiner* — Krishnan S Menon
(74) *Attorney, Agent, or Firm* — Oliff & Berridge, PLC (57) ABSTRACT

The present invention relates to an improved electrochemical device, such as a primary cell battery, that is capable of being manufactured on the miniature-level (e.g., a size amenable to being used in an injectable medical apparatus). An exemplary electrochemical device comprises a header comprising a pin extending into an electrode space defined by the header and a device case. The pin also extends into a first electrode and is configured to be the current collector of the device. An electrode pressure plate is disposed adjacent a second electrode, and a pressure maintaining spring interfaces with the pressure plate and a device base. The pressure maintaining spring is configured to expand as the electrochemical device discharges, thereby maintaining a contact pressure within the device.

18 Claims, 7 Drawing Sheets

ELECTROCHEMICAL DEVICE

CROSS-REFERENCE TO RELATED APPLICATIONS

This application claims the benefit of U.S. Provisional Application Ser. No. 60/887,795 entitled "PRIMARY MICRO CELL BATTERY," which was filed on Feb. 1, 2007.

BACKGROUND

In today's market for implantable medical apparatuses, the demand for smaller batteries is growing rapidly. Such a demand is particularly acute with respect to injectable medical apparatuses where available space is especially at a premium. At the same time size restraints are requiring smaller and smaller batteries, power requirements are dictating that the smaller batteries have greater energy density and/or electrical capacity than their larger counterparts.

One aspect of current batteries that influences both size and energy density is that a tab is used to connect the electrodes to the battery terminal. Such a configuration does not provide pressure for the cell stack, and such a configuration puts a lower limit on the size of the batteries and an upper limit on the energy density. Another challenge is that conventional batteries use multiple layers of cathode and anode material, which add significantly to production costs and also put a lower limit on the size of the batteries.

SUMMARY

While the ways in which the present invention addresses the disadvantages of the prior art will be discussed in greater detail below, a general summary is provided here. The present invention relates to an improved electrochemical device, such as a primary cell battery, that is capable of being manufactured on the miniature-level (e.g., a size amenable to being used in an injectable medical apparatus). An exemplary electrochemical device comprises a header comprising a pin, wherein the pin comprises a terminal end and an electrode end, and wherein the terminal end comprises a first device terminal. The electrochemical device further comprises a device case comprising a header end and a base end, wherein the header end is adjacent to the header, wherein the device case and the header define an electrode space, and wherein the electrode end of the pin extends into the electrode space.

A first electrode is configured to be disposed within the electrode space and around the electrode end of the pin, and a separator is configured to be disposed between the first electrode and a second electrode. An electrode pressure plate is disposed adjacent the second electrode. A device base is positioned adjacent the base end of the device case, wherein the device base comprises a spring retaining surface. A pressure maintaining spring comprising a base end and a pressure plate end is disposed adjacent to the spring retaining surface of the device base, wherein the pressure plate end is adjacent to the electrode pressure plate. The device base may be configured to define a second device terminal.

The pressure maintaining spring is configured to expand as the electrochemical device is discharged and retains pressure and contact between the device case and the second electrode in order to increase performance of the electrochemical device and to allow the device to be produced on a smaller scale than currently available electrochemical devices.

DETAILED DESCRIPTION

The following description is of exemplary embodiments of the invention only, and is not intended to limit the scope or applicability of the invention in any way. Rather, the following description is intended to provide convenient illustrations for implementing various embodiments of the invention. As will become apparent, various changes may be made to the methods described in these embodiments without departing from the spirit and scope of the invention.

Various embodiments of an electrochemical device are disclosed herein. The term "electrochemical device" may include any device from among various classes of devices, such as batteries, capacitors, and other devices that process electricity via a chemical reaction. Further, where a battery is mentioned herein, both primary and secondary batteries are within the scope of the present disclosure. Therefore, whenever a battery is mentioned throughout this disclosure, it is understood that the disclosure is not limited solely to a battery; rather, all electrochemical devices, such as capacitors and other devices, are also contemplated.

In accordance with various embodiments of the present invention, an electrochemical device, such as a primary miniature battery 10 is disclosed. Such a battery may be used in various apparatuses, such as implantable and/or injectable medical apparatuses. One exemplary embodiment of the invention allows battery 10 to be produced as a substantially cylindrical battery that has a length of approximately 6-7 mm and a diameter of approximately 2-3 mm. In other embodiments of the invention, battery 10 may comprise dimensions that are smaller than the dimensions of batteries produced by known methods. One of ordinary skill in the art will appreciate that these dimensions are merely exemplary for the battery, and that other sizes, shapes, and configurations appropriate for the end use (e.g., in a medical apparatus) may be used in accordance with various embodiments of the invention, and that substantially larger or smaller batteries may be used in accordance with the present disclosure.

With reference to FIGS. 1-4, an exemplary electrochemical device 10 comprises a battery case 8 and a header 2 that is adjacent to one end of battery case 8. In accordance with one aspect of an exemplary embodiment, header 2 may be configured to comprise a terminal pin 16. An exemplary header 2 is configured to have substantially the same outside diameter as cell casing 8, such that when header 2 interfaces with cell casing 8, the diameter of electrochemical device 10 remains substantially constant (see, e.g., FIGS. 1, 3). Battery case 8 and header 2 together define an electrode space wherein a first electrode 28 and a second electrode 30 may be disposed. Electrochemical device 10 further comprises a battery base, such as bottom disk 44, adjacent to the other end of battery case 8, and a spring 38 disposed between battery base 44 and second electrode 30. Battery base 44 comprises a channel, such as electrolyte fill hole 52, and a sealing member 50 disposed within channel 52.

In accordance with various embodiments of the invention, an electrochemical device, such as battery 10, comprises two general groups of components: chemically active components and chemically inactive components. Chemically active components may comprise, for example, a first electrode 28, a second electrode 30, and an electrolyte 34. Chemically inactive components of the device may comprise, for example, a header 2, a terminal pin 16, a battery case 8, a battery base 44, a sealing ball 50, a spring disk 36, and a spring 38.

Figure 5A:
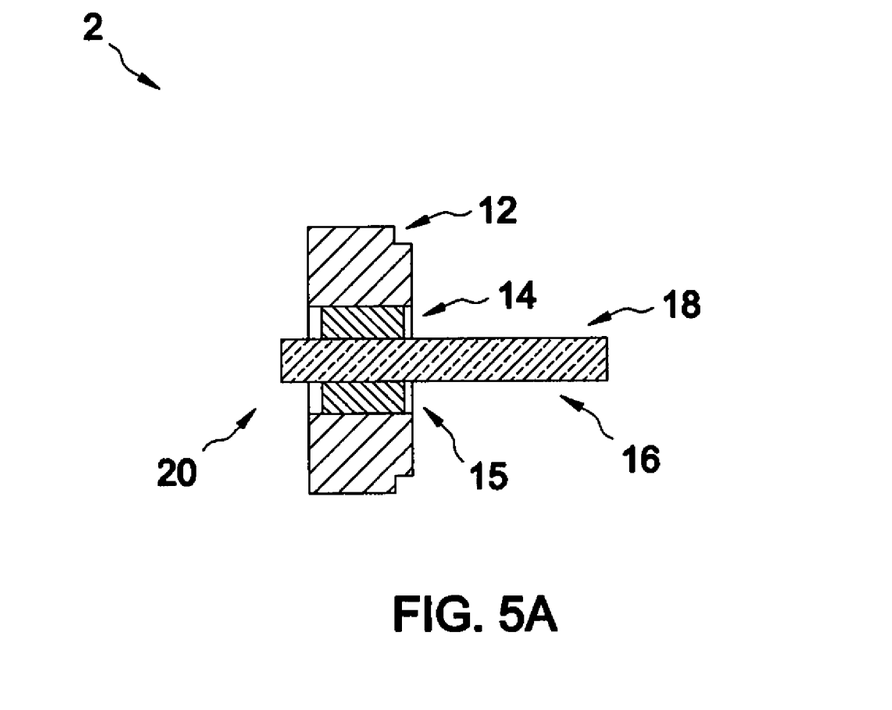
FIG. 5A illustrates a cross sectional view of a header of an exemplary embodiment of the electrochemical device.
Figure 5B:
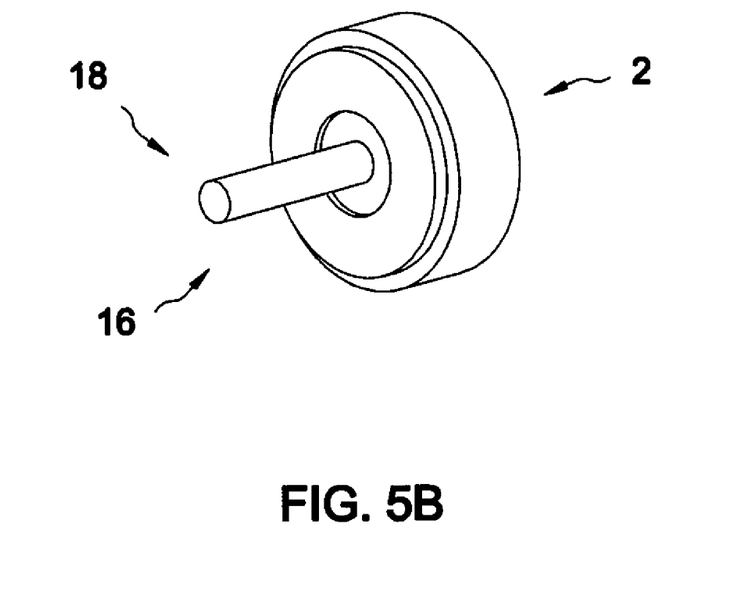
FIG. 5B illustrates a perspective view of the header of the embodiment depicted in FIG. 5A.

With reference to FIGS. 5A-5B, an exemplary header 2 comprises (in addition to terminal pin 16) a header body 12 and a pin-header seal 14, such as a glass-to-metal seal. In accordance with other exemplary embodiments, pin-header seal 14 may comprise a ceramic seal or other seal configured to electrically insulate pin 16 from header 2, header body 12 and/or cell casing 8. In still other embodiments, pin-header seal 14 may comprise a glass sealing member and a ceramic sealing member 15. Pin-header seal 14, according to one embodiment, is substantially cylindrical in shape; however, pin-header seal 14 may be any shape that may sealably receive pin 16, such as a cube or a rectangular parallelepiped. In a further embodiment where a glass-to-metal seal is employed, any suitable means known in the art for attaching glass to metal, for example, glass to metal epoxies, may be used to seal the pin-header seal 14 to the header 2.

Pin 16 in an exemplary embodiment comprises a terminal end 20 and an electrode end 18. Terminal end 20 may be configured to comprise the positive terminal of battery 10 in certain embodiments, and the negative terminal of battery 10 in other embodiments. Terminal pin 16 comprises a generally elongated member disposed within pin-header seal 14 such that electrode end 18 of the pin protrudes substantially further from one side of the pin-header seal 14 than the terminal end 20 of the terminal pin protrudes from the other side of the pin-header seal 14. In other embodiments, terminal end 20 and electrode end 18 protrude substantially equally from either end of header 2, and in still other embodiments, terminal end 20 may protrude further from header 2 than electrode end 18. In accordance with one aspect of an exemplary embodiment of the invention, pin 16 is comprised of molybdenum.

With reference again to FIGS. 1-4, cell casing 8, in an exemplary embodiment, is substantially cylindrical in shape and comprises a header end 7 and a base end 9. Header end 6 is configured to be adjacent to header 2, and cell casing 8 is configured to comprise substantially the same outside diameter and/or profile as header 2. Cell casing 8 may be configured to comprise a metal tube, and in accordance with an aspect of an exemplary embodiment, cell casing 8 is made of titanium. Cell casing 8 is configured to receive header 2 and battery base or bottom disk 44 in order to form a substantially cylindrical battery 10. In a further embodiment, header 2 and bottom disk 44 are welded to cell casing 8. In yet another embodiment, cell casing 8 and header 2 may be formed in the same manufacturing process, e.g., by deep drawing cell casing 8, such that header 2 need not be welded to cell casing 8. Other embodiments provide that cell casing 8 may be part of the assembly tooling and/or fixtures during the cathode population process as discussed further below. Still other embodiments provide a cell casing/header assembly that has a cross section other than a cylindrical cross section, for example, a rectangular cross section.

Header 2 and cell casing 8 together define an electrode space 29 configured to receive first electrode 28, second electrode 30, and the other elements of battery 10. According to an exemplary embodiment of the invention, a cell pack insulator 24 is configured to fit within electrode space 29 and receive first electrode 28, second electrode 30, and electrode separator 32. In accordance with one aspect of an exemplary embodiment, cell pack insulator 24 comprises a tube and/or tubular mesh that insulates the cathode material from cell casing 8. Terminal pin 16 protrudes through a header surface 26 of cell pack insulator 24 as it passes from header 2 into first electrode 28.

In accordance with another aspect of an exemplary embodiment, terminal pin 16 is configured to pass through header insulator 22, which is configured to insulate cell pack insulator 24 from header 2. Header insulator 22 is disposed between header 2 and cell pack insulator 24, and in an exemplary embodiment of the invention, header insulator 22 comprises a polyimide insulator. In accordance with another embodiment, header insulator 22 acts as a double-insulator to prevent cathode material that might leak between terminal pin 16 and cell pack insulator 24 from contacting a part of header 2, in an embodiment where header 2 is configured to comprise part of the negative terminal of battery 10.

According to another embodiment of the present invention, first electrode 28 is configured to receive electrode end 18 of terminal pin 16, such that first electrode 28 covers and/or encloses electrode end 18 of terminal pin 16. In one embodiment of the invention, electrode end 18 of terminal pin 16 is cupped to aid in holding first electrode 28 in place. In other embodiments of the invention, any mechanical configuration of terminal pin 16 may be employed that is configured to maintain contact between first electrode 28 and terminal pin 16. Because first electrode 28 is compressed onto terminal pin 16, the pin is configured to be the current collector in the miniature battery 10. As such, an additional connector and/or current collector, such as a tab is not necessary according to various embodiments of the invention; however, a separate current collector may be employed without departing from the scope of the invention.

In an exemplary embodiment of the invention, first electrode 28 comprises a cathode electrode. Cathode 28 may comprise a manganese dioxide ($MnO_2$) slug with a density of approximately 1.5-3.5 $g/cm^3$, where the active weight of the cathode slug is approximately 5-15 mg and the cathode formulation comprises $MnO_2$, carbon, and polytetrafluoroethylene (PTFE). It should be understood that this composition only represents one aspect of an exemplary embodiment of the invention, and any composition configured to function as a cathode is contemplated within the scope of the present invention. To facilitate the efficient manufacture of large quantities of battery 10, a pre-formed $MnO_2$ slug may be manufactured to ease the cathode population process. In an exemplary embodiment of the invention, the cathode slug comprises a single, solid body of $MnO_2$ material and is configured to be substantially cylindrical in shape.

In accordance with another exemplary embodiment, second electrode 30 comprises an anode. Anode 30 may be configured to comprise a lithium slug with a density of approximately 0.5 $g/cm^3$, where the weight of the lithium slug is approximately 0.5-1.5 mg, and where the lithium is substantially pure lithium metal. It should be understood that this composition represents only one aspect of an exemplary embodiment of the invention, and any composition configured to function as an anode is contemplated within the scope of the present invention. In a further exemplary embodiment of the invention, lithium anode 30 comprises a single lithium slug that is substantially cylindrical in shape. In accordance with one aspect of an exemplary embodiment, anode 30 may comprise alkali and/or alkaline earth metals. Single anode slug 30 may be configured to fit within cell casing 8.

An exemplary battery 10 comprises an electrode separator 32 positioned between cathode 28 and anode 30 such that electrolyte 34 may permeate electrode separator 32, and such that anode 30 is physically separated from cathode 28. In an exemplary embodiment of the invention, electrode separator 32 comprises a celgard separator.

An exemplary battery 10 further comprises a battery base, or bottom disk 44. Battery base 44 may be configured to be substantially cylindrical, where the face of battery base 44 that interfaces with cell casing 8 and spring 38, the base spring face 46, may have a larger outside diameter than the base outside face 48 of the disk (see FIGS. 1, 3-4). Thus, moving in the direction from terminal pin 16 to base outside face 48, battery base 44 is slightly tapered to a smaller diameter. Such a taper may be configured to facilitate insertion of battery 10 into the human body as part of a medical apparatus. For example, the battery-apparatus assembly may be inserted via a catheter, with the tapered battery base 44 being inserted first into the catheter.

Battery base 44 may be secured to base end 9 of battery case 8 by any one of a number of methods, including by various welding methods, such as laser welding. IN accordance with one aspect of an exemplary embodiment, base spring face 46 may comprise a spring retaining surface that is configured to properly locate spring 38 within battery 10. In an exemplary embodiment of the invention, spring face 46 of battery base 44 is tapered to receive spring 38, such that the taper provides additional support and stability for spring 38. For example, with reference to FIGS. 4 and 6, wherein spring 38 comprises a conical spring, spring retaining surface 46 may comprise a surface tapered at an angle substantially similar to the taper angle of conical spring 38.

Figure 1:
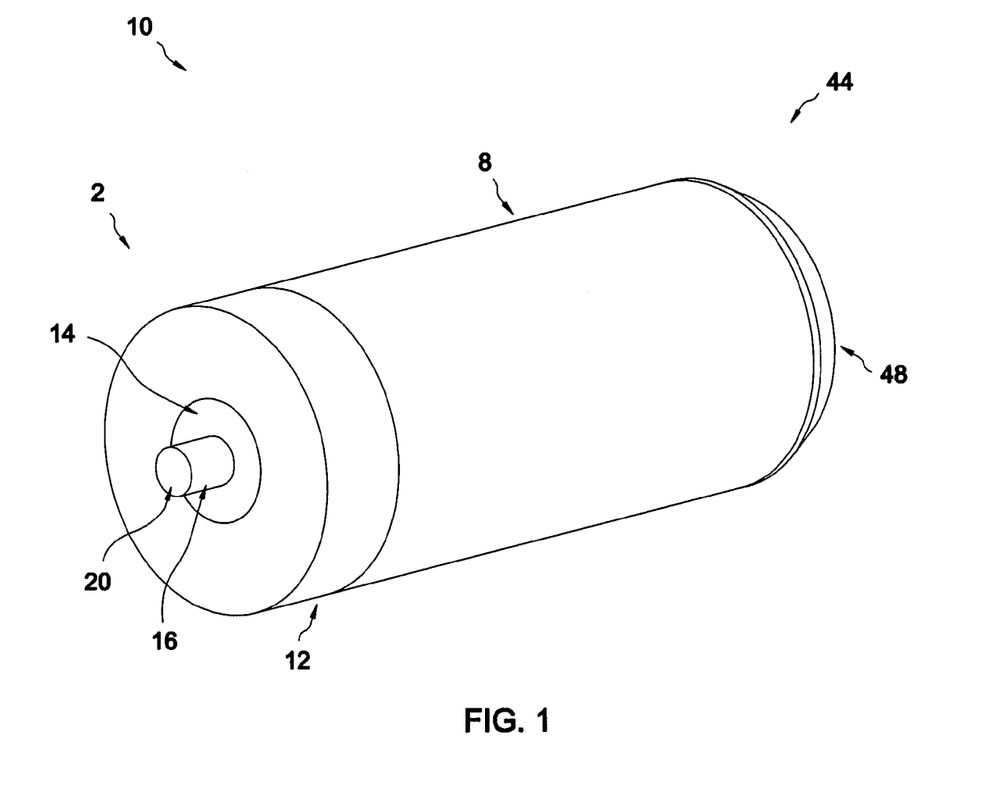
FIG. 1 illustrates a perspective view of an electrochemical device according to an exemplary embodiment of the present invention.
Figure 2:
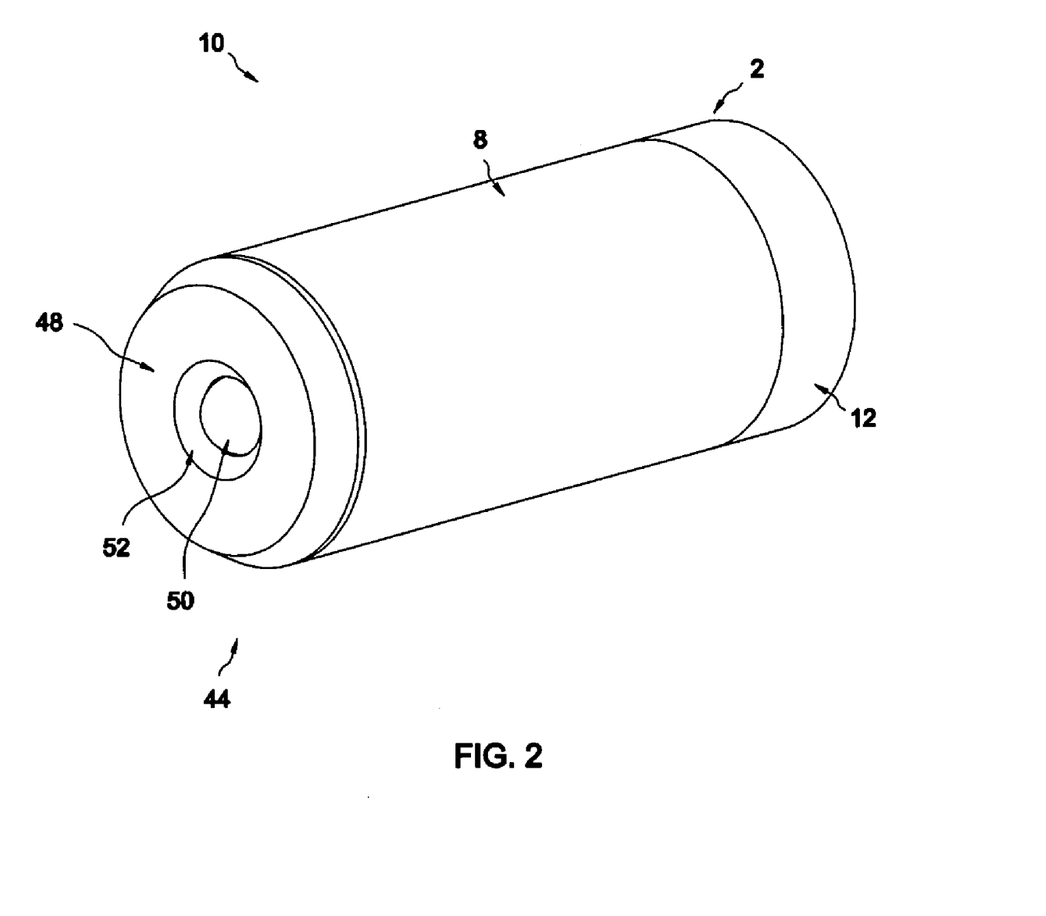
FIG. 2 illustrates a perspective view of an electrochemical device according to a further embodiment of the present invention.
Figure 3:
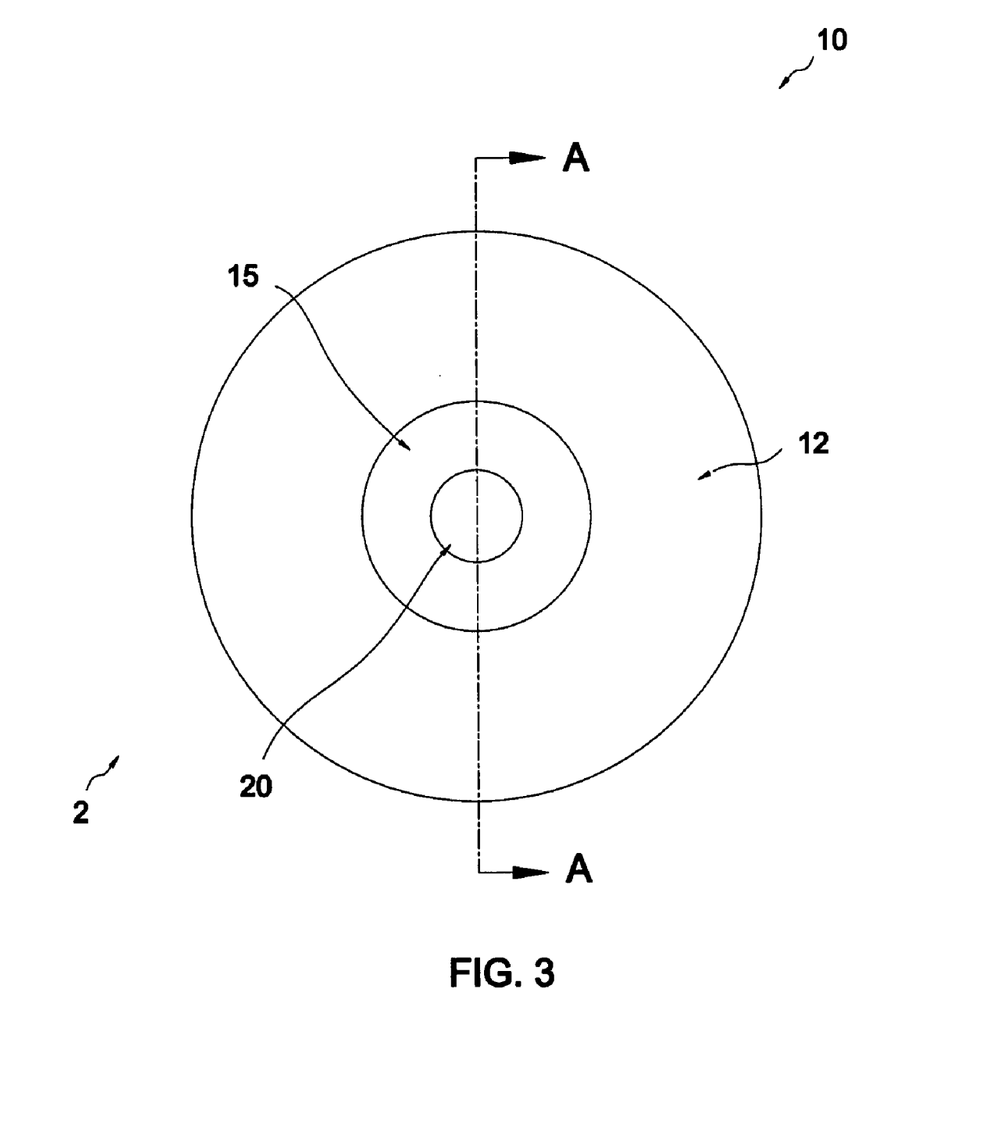
FIG. 3 illustrates a front view of the electrochemical device according to yet another embodiment of the present invention.
Figure 4:
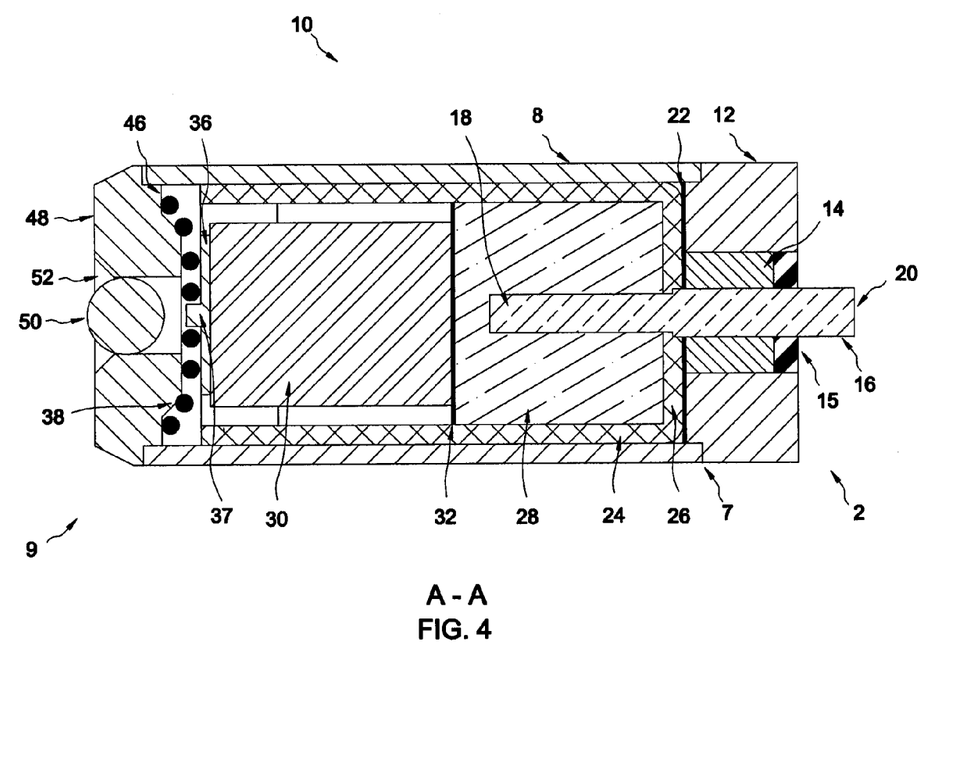
FIG. 4 illustrates a cross sectional view of the electrochemical device according to the embodiment of FIG. 3.
Figure 7:
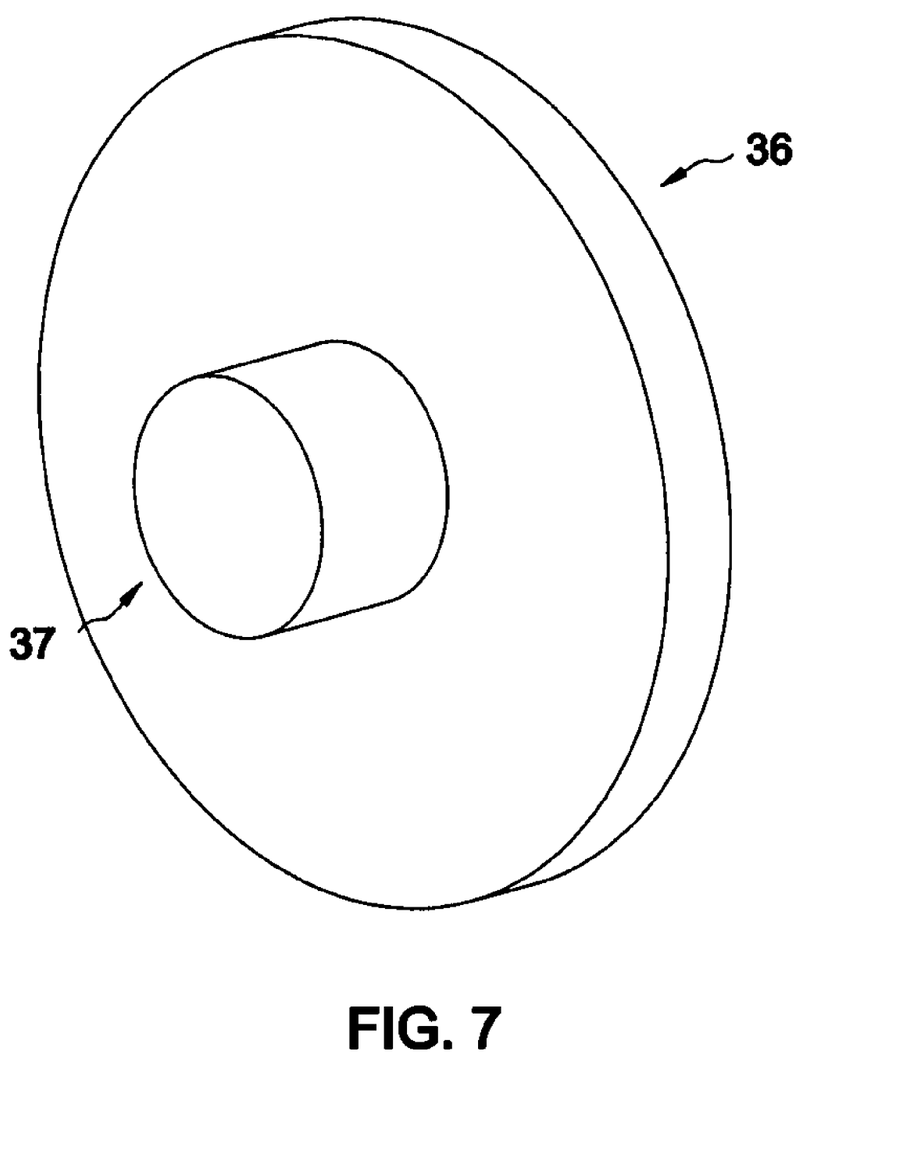
FIG. 7 illustrates a perspective view of an electrode pressure plate according to an exemplary embodiment of the electrochemical device.

According to another exemplary embodiment of the invention, and with reference to FIGS. 4 and 7, a spring disk 36 is disposed proximate anode 30, and between anode 30 and base spring face 46 of battery base 44. Spring disk 36 is configured to be proximate anode 30 and to receive spring 38, and spring 38 is also configured to interface with bottom disk 44. In combination, spring 38 exerts force on bottom disk 44 and spring disk 36, thereby maintaining a contact pressure between cathode 28 and anode 30. In other embodiments, spring 38 creates and maintains a contact pressure between anode 30 and the terminal of battery 10 that is in electrical communication with anode 30, for example, bottom disk 44 and/or battery case 8.

In accordance with another exemplary embodiment, spring disk 36 may further comprise a spring locating member 37 configured to locate, position, and/or maintain a position of spring 38 with respect to spring disk 36. Spring locating member 37 may comprise a pin, depression, cup, and/or other configuration that maintains a position of spring 38. In accordance with one aspect of an exemplary embodiment, spring disk 36 may comprise lithium. In other embodiments, spring disk 36 may comprise the same material as second electrode 30, and in further embodiments, spring disk 36 may comprise any material that allows spring 38 to maintain a contact pressure between first electrode 28 and second electrode 30. In another embodiment of the invention, conical spring 38 may be welded to base spring face 46 of battery base 44 and/or to spring disk 36.

An exemplary spring disk 36 is configured to aid in preventing spring 38 from protruding into second electrode 30 and/or to maintain a sufficient contact pressure between first and second electrodes 28, 30 and/or other components of battery 10. In an exemplary embodiment of the invention, when the battery 10 is initially assembled, spring 38 is in compression between electrode pressure plate 36 and battery base 44, such that spring 38 is substantially compressed. As battery 10 becomes discharged over time, spring 38 is configured to expand in order to maintain a contact pressure between anode 30, spring disk 36, battery base 44, and/or cell casing 8. Moreover, pressure maintaining spring 38 is configured to maintain a contact pressure between anode 30, electrode separator 32, and cathode 28, such that electrons may flow between the electrodes and produce a voltage across the terminals.

Figure 6A:
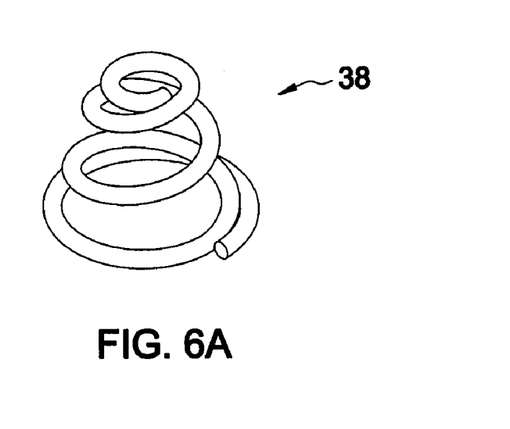
FIG. 6A illustrates a perspective view of a spring according to another exemplary embodiment of the electrochemical device.
Figure 6B:
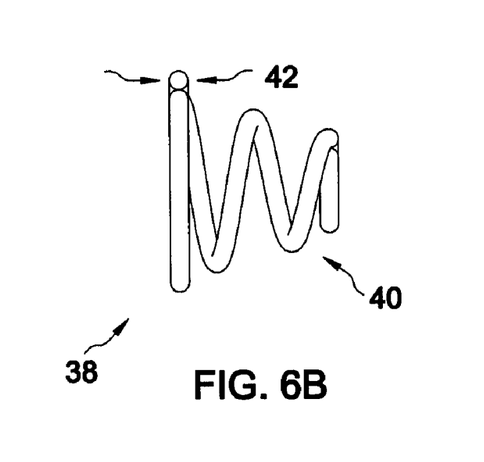
FIG. 6B illustrates a side view of the spring depicted in FIG. 6A.
Figure 6C:
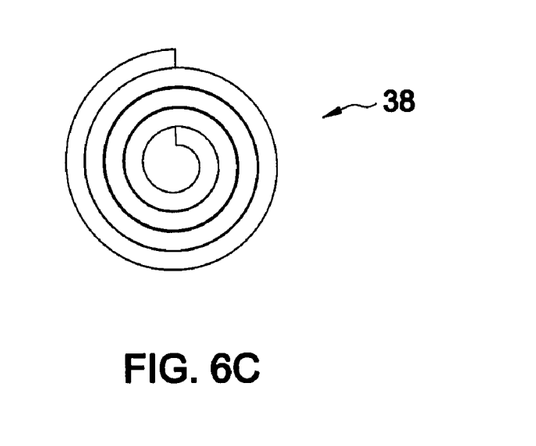
FIG. 6C illustrates a top view of the spring depicted in FIG. 6A.

In accordance with another exemplary embodiment of the invention, spring 38 may be substantially cylindrical. In other embodiments, spring 38 may comprise other configurations, such as, for example, an "hourglass" or "balloon" configuration. In further embodiments of the invention, spring 38 may be any configuration that reduces the fully-compressed height of spring 38 from the fully-compressed height of a cylindrical spring. For example, where spring 38 comprises a coiled wire 40 with a wire diameter 42 in a conical spring configuration, conical spring 38 has a fully-compressed height equal to wire diameter 42, whereas a cylindrical spring's fully-compressed height equals wire diameter 42 multiplied by the number of coils. Still further embodiments of the invention provide a spring 38 having any configuration that facilitates maintaining a contact pressure between electrodes 28, 30. Spring 38 may be configured to comprise any number of materials, such as, for example, stainless steel, nickel, titanium, and/or copper.

Exemplary battery devices as disclosed herein that comprise cathode slug 28 with pin 16 embedded in cathode slug 28, and that comprise spring 38 that maintains a contact pressure between anode slug 30 and cathode slug 28, are capable of being produced at a smaller size and with greater energy density and/or electrical capacity than batteries constructed according to presently-known techniques. Battery 10, for example, does not require the separate attachment of current collector tabs between terminal pin 16 and cathode 28, so the head space that would be required to make such an attachment is available for active components of battery 10, such as cathode 28. Increasing the volume percentage of active materials in battery 10 results in an increased energy density in battery 10. For example, an exemplary embodiment of battery 10 has an energy density of approximately 200 Wh/l.

Battery base 44, according to one aspect of an exemplary embodiment of the invention, comprises a channel 52 substantially in the center of battery base 44 (see FIGS. 3-4), and which extends through the battery base 44. Channel 52 is configured to allow an electrolyte 34 to be introduced into battery 10 after all of the components of the battery have been assembled except for a sealing ball 50. In accordance with one aspect of an exemplary embodiment of the invention, electrolyte 34 comprises lithium perchlorate (LiClO$_4$) and propylene carbonate (PC), 1,2-dimethoxyethane (DME), and ethylene carbonate (EC). However, it should be understood that any electrolyte now known or hereafter developed is within the scope of the present invention.

In accordance with another aspect of an exemplary embodiment, electrolyte fill hole 52 is configured to receive sealing ball 50 such that electrolyte fill hole 52 becomes sealed and electrolyte 34 does not flow out of battery 10. In one exemplary embodiment, sealing ball 50 is welded to battery base 44 after electrolyte 34 has been introduced into battery 10 in order to further enhance the seal between sealing ball 50 and battery base 44. In a further embodiment, the battery assembly is compressed and battery base 44 is attached to cell casing 8 by means of a weld.

In accordance with one aspect of an exemplary embodiment, a laser beam may be used to create a laser weld around the interface between electrolyte fill hole 52 and sealing ball 50. In a further embodiment of the invention, the laser beam may be defocused such that the diameter of the laser beam at the welding zone is larger than the diameter of electrolyte fill hole 52. The defocused laser beam is configured to weld sealing ball 50 to battery base 44 in a single spot weld. Such a single spot weld is configured to improve the seal between base 44 and ball 50 as compared to laser welding around the perimeter of ball 50. Using a defocused laser beam also decreases the weld time and therefore has the potential to decrease the overall manufacturing time of battery 10.

Battery 10 according to various embodiments of the present invention comprises a first terminal and a second terminal, such that electrons are configured to flow into one of the terminals and out of the other terminal. The first terminal may comprise the positive terminal of the battery, and the second terminal may comprise the negative terminal. In other embodiments, the first terminal may comprise the negative terminal, and the second terminal may comprise the positive terminal. In still other embodiments, battery case 8 may be neutral and may not comprise either the positive or negative terminal.

In an exemplary embodiment, terminal pin 16 comprises the positive terminal of battery 10. The negative terminal in such an embodiment may comprise at least one of header 2, battery case 8, and battery base 44. In other embodiments, the negative terminal may comprise only battery base 44 and battery case 8. Other exemplary embodiments of the invention provide other terminal configurations. For example, terminal pin 16 may be configured to be inserted in anode 30 and electrode pressure plate 36 may be configured to interface with cathode 28. In such an embodiment, terminal pin 16 may comprise the negative terminal of battery 10, and battery case 8, battery base 44, and/or header 2 may comprise the positive terminal of battery 10.

An exemplary method for manufacturing battery 10 according to an embodiment of the present invention is now disclosed. Terminal pin 16 is inserted into pin-header seal 14, such that the interface between pin-header seal 14 and terminal pin 16 does not allow any leakage of the electrolyte 34 out of the miniature battery 10. Pin-header seal 14 and terminal pin 16 assembly are then disposed within header body 12. In another embodiment, terminal pin 16, header body 12, and pin-header seal 14 may be pre-manufactured such that header 12 is fully assembled prior to manufacturing battery 10.

In an exemplary embodiment, header body 12 is the same material as cell casing 8, and in other embodiments, header body 12 is titanium. Pin-header seal 14 is attached to the header 12 via a glass to metal compression seal. Header 2 is then welded to the cell casing 8 forming electrode space 29 such that electrode end 18 of terminal pin 16 extends into electrode space 29 and terminal end 20 of the terminal pin 16 extends out from header 2.

According to a further embodiment of the invention, header insulator 22 is placed in cell casing 8 proximate header 12 such that electrode end 18 of terminal pin 16 passes through header insulator 22. Cell pack insulator 24 is then inserted into cell casing 8 such that electrode end 18 of terminal pin 16 passes through header surface 26 of cell pack insulator 24. Cell pack insulator 24 serves to insulate cathode 28 from battery case 8, for example, where battery case 8 comprises part of the negative terminal of battery 10.

In accordance with various exemplary embodiments, for manufacturing purposes, cell casing 8 may become part of the assembly fixtures and/or assembly tooling during the cathode population process. During an exemplary cathode population process, a cathode population tool is inserted into base end 9 of battery case 8. The cathode population tool has a funnel that seats within cell pack insulator 24 and bottoms out against base end 9 of battery case 10. Thus, battery case 10 and cell pack insulator 24 become part of the cathode assembly setup. Cathode 28 is then pressed down the funnel into the electrode space 29 with a plunger or other suitable tool. After the correct amount of cathode 28 is pressed into cell pack insulator 24, the cathode population tool is removed.

In another exemplary embodiment of the invention, cathode 28 is pressed into cell pack insulator 24 that is located in cell casing 8 such that it covers electrode end 18 of terminal pin 16. In this embodiment, the cathode 28 is compressed directly onto terminal pin 16, thus making terminal pin 16 the current collector for the battery. In another embodiment of the invention, cathode 28 may be coated onto a screen and/or a perforated foil and placed against the inside of cell casing 8 and cell pack insulator 24. In still another embodiment of the invention, for example in larger cell manufacturing quantities (e.g., in a production environment), a pre-formed cathode pellet may be manufactured to ease the cathode population process.

Following cathode population, electrode separator 32 is placed proximate cathode 28 to separate cathode 28 and anode 30. Anode 30 is then positioned proximate electrode separator 32. With electrodes 28, 30 and electrode separator 32 in place, the assembly is ready to be put under mechanical pressure. Because some exemplary embodiments comprise a single cathode slug and a single anode slug, battery 10 is capable of being made smaller than currently-available batteries. The single-cathode/single-anode design also makes the assembly process more efficient and less costly.

According to an embodiment of the invention, electrode pressure plate 36 is placed proximate anode 30 such that electrode pressure plate 36 is in electrical communication with anode 30. In an exemplary embodiment of the invention, electrode pressure plate 36 is made of stainless steel, and in another embodiment, it is made of the same material as anode 30. Spring 38 is then placed proximate electrode pressure plate 36 and is configured to interface with spring locating member 37. Spring face 46 of bottom disk 44 is seated into cell casing 8 and welded into place, such that bottom disk 44 receives one end of spring 38 at spring face 46, and such that bottom disk 44 compresses electrodes 28, 30 and spring 38 in order to facilitate conduction and electrochemical reactions within battery 10. Spring 38 expands as battery 10 discharges, such that contact between the cell components is maintained. Test results have shown that the cell utilization is rated at approximately 78% and the capacity is approximately 2 mAhr according to one embodiment of the present invention. Test results for another embodiment of the invention have shown that the short term open circuit voltage (OCV) is more stable than previous battery designs.

In an exemplary embodiment of the invention, spring 38 is substantially, if not completely, compressed when bottom disk 44 is initially attached to the cell casing 8, thereby providing the greatest expansion of spring 38 during discharge of the electrodes. In further embodiments of the invention, spring 38 is compressed sufficiently to allow a decrease in size of first electrode 28 and/or second electrode 30 while maintaining a desired contact pressure between the electrodes.

In further exemplary embodiment of the invention, with bottom disk 44 secured to the cell assembly, the cell assembly is ready to receive electrolyte 34. Electrolyte 34 is introduced through the channel 52 in bottom disk 44 such that electrolyte 34 substantially fills the voids within the cell assembly and such that the electrolyte permeates electrode separator 32. After electrolyte 34 has been introduced, sealing ball 50 is inserted into the channel 52, for example by pressing sealing ball 50 into channel 52, and is then welded in place. In one embodiment of the invention, sealing ball 50 comprises the same material as bottom disk 44.

Although battery 10 has been described in connection with a Li—$MnO_2$ chemistry, it should be understood that many other chemistries may be employed without departing from the scope of the present invention. For example, the following cell chemistries are some of those that may be employed: $LiCf_x$, Li/SVO, Li/$SO_2$, Li/$SOCl_2$ and/or mixtures thereof with lithium ion. Additionally, it should be understood that the overall shape of the battery need not be cylindrical, but could be other shapes readily adaptable to the embodiments of the invention herein disclosed. For example, the battery could be cubical or could be a rectangular parallelepiped or other prismatic shape.

It should be understood that various principles of the invention have been described in illustrative embodiments. However, many combinations and modifications of the above-described formulation, proportions, elements, materials, and components used in the practice of the invention, in addition to those not specifically described, may be varied and particularly adapted to specific environments and operating requirements without departing from those principles. Other variations and modifications of the present invention will be apparent to those of ordinary skill in the art, and it is the intent that such variations and modifications be covered by this disclosure.

I claim:

1. An electrochemical device, comprising:
   a header comprising a pin, wherein the pin comprises a terminal end and an electrode end, and wherein the terminal end comprises a first device terminal;
   a device case comprising a header end and a base end, wherein the header end is adjacent to the header, wherein the device case and the header define an electrode space, and wherein the electrode end of the pin extends into the electrode space;
   a first electrode disposed within the electrode space adjacent the electrode end of the pin;
   a separator disposed between the first electrode and a second electrode;
   an electrode pressure plate disposed adjacent the second electrode;
   an electrolyte permeating the separator;
   a device base adjacent the base end of the device case, wherein the device base comprises a spring retaining surface and an electrolyte fill hole;
   a pressure maintaining spring comprising a base end and a pressure plate end, wherein the base end is adjacent to the spring retaining surface of the device base, wherein the pressure plate end is adjacent to the electrode pressure plate; and
   a sealing ball disposed within the electrolyte fill hole of the device base, wherein the sealing ball and the device base define a second device terminal.

2. The electrochemical device of claim 1, wherein the second device terminal comprises the sealing ball, the device base, and the device case.

3. The electrochemical device of claim 2, wherein the header further comprises a header body and a pin seal disposed between the header body and the pin.

4. The electrochemical device of claim 3, wherein the second device terminal further comprises the header body.

5. The electrochemical device of claim 1, wherein the first device terminal comprises a positive device terminal and the second device terminal comprises a negative device terminal, and wherein the first electrode comprises a single-slug cathode and the second electrode comprises a single-slug anode.

6. The electrochemical device of claim 1, wherein the electrode end of the terminal pin comprises a current collector of the electrochemical device.

7. The electrochemical device of claim 1, wherein the pressure maintaining spring comprises:
   a spring wire having a wire diameter; and
   a compressed height, wherein the compressed height is less than or equal to two times the wire diameter.

8. The electrochemical device of claim 1, wherein the pressure maintaining spring comprises one of a conical spring, a balloon-shaped spring, and an hourglass-shaped spring.

9. The electrochemical device of claim 1, wherein the electrochemical device is a primary battery.

10. The electrochemical device of claim 1, wherein the electrochemical device is a secondary battery.

11. The electrochemical device of claim 1, wherein the electrochemical device is a capacitor.

12. A method for manufacturing an electrochemical device as in claim 1, comprising:
    providing a header comprising a terminal pin;
    attaching the header to a first end of a device case;
    populating a first electrode;
    positioning a separator between the first electrode and a second electrode;
    compressing a spring between the second electrode and a device base disposed adjacent to the second end of the device case;
    sealing an electrolyte fill hole in the device base thereby forming the electrochemical device.

13. The method of claim 12, further comprising inserting a population tool into the device case, such that the population tool abuts a second end of the device case.

14. The method of claim 12, wherein the populating of the first electrode comprises populating a single slug cathode around a current collector of the electrochemical device.

15. The method of claim 12, wherein the compressing of the spring further comprises compressing the spring to a height equal to or less than two times a wire diameter of the spring.

16. The method of claim 12, further comprising positioning an electrode pressure plate between the spring and the second electrode.

17. The method of claim 12, further comprising:
    inserting a sealing ball into the electrolyte fill hole prior to the sealing of the electrolyte fill hole; and
    welding the sealing ball to the device base.

18. The method of claim 17, further comprising defocusing a laser beam and welding the sealing ball via a single spot weld.

* * * * *